Dec. 29, 1931.  A. BOUSFIELD  1,838,985
WEIGH CAN SCALE
Filed May 27, 1929  3 Sheets-Sheet 1

INVENTOR
ALFRED BOUSFIELD
BY
ATTORNEY

Dec. 29, 1931.  A. BOUSFIELD  1,838,985
WEIGH CAN SCALE
Filed May 27, 1929  3 Sheets-Sheet 2

INVENTOR
ALFRED BOUSFIELD
BY
Henry Thoreau
ATTORNEY

Dec. 29, 1931.  A. BOUSFIELD  1,838,985
WEIGH CAN SCALE
Filed May 27, 1929  3 Sheets-Sheet 3

INVENTOR
ALFRED BOUSFIELD
BY
ATTORNEY

Patented Dec. 29, 1931

1,838,985

UNITED STATES PATENT OFFICE

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT

WEIGH-CAN SCALE

Application filed May 27, 1929. Serial No. 366,274.

This invention relates to weighing scales and more particularly to weighing scales of the type known as weigh-can scales such as are used in the receiving rooms of milk-plants, creameries and condenseries and wherever it is necessary to weigh large quantities of milk.

A well-known weighing device of the class referred to is the overhead-suspension scale, which comprises a set of levers suspended either from the ceiling or from a steel frame supported by posts resting on the floor. Suspension rods depending from the scale levers support the tank into which the milk is poured for the weighing operation. Commonly, the levers and other scale parts are treated with a rust-proofing solution. However, conditions which obtain in all dairy product plants are extremely severe on the scales. The sanitary conditions which must be maintained at all times require the use of large quantities of hot water, live steam and cleaning compounds. Under the action of the cleansing substances, the scale parts lose their protective coating, leaving the surface exposed to the rust-producing agents. A formation of rust upon the scale parts destroys the accuracy of the scale and shortens the effective life thereof. It is, therefore, an object of this invention to provide an improved weighing machine which will be free from the above-mentioned and other disadvantages and which will be especially simple in construction and efficient in operation.

In one aspect the invention comprises the provision in a weighing machine of a housing for the scale levers, the lower part whereof, forms a support for the lever system, said housing having means for preventing foreign matter from entering therein.

In another aspect the invention comprises a weighing machine in which means are provided for circulating air through the scale housing whereby the condensation of moisture, or cold sweating, on the scale parts, is prevented.

Another object of this invention is to provide a milk weighing machine of relatively large capacity which is easily movable from one location or plant to another.

Other objects of this invention, together with certain details of construction and combinations of parts, will be described in the specification and pointed out in the appended claims.

In the drawings.

Similar characters of reference designate corresponding parts throughout the several views of the drawings.

Figure 1:
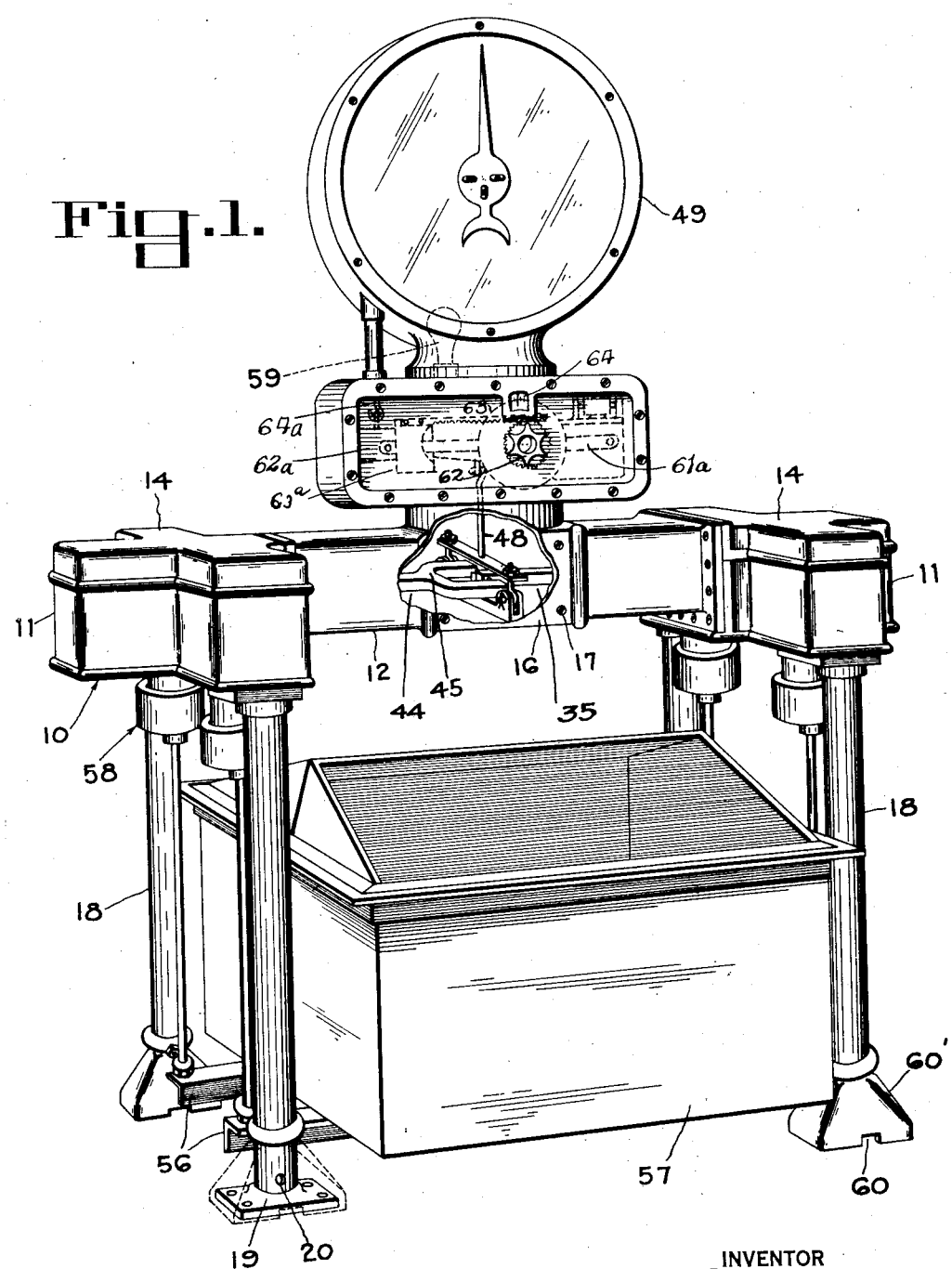
Figure 1 is a front elevational view of the scale in perspective with part of the housing broken away to show the center connection.
Figure 2:
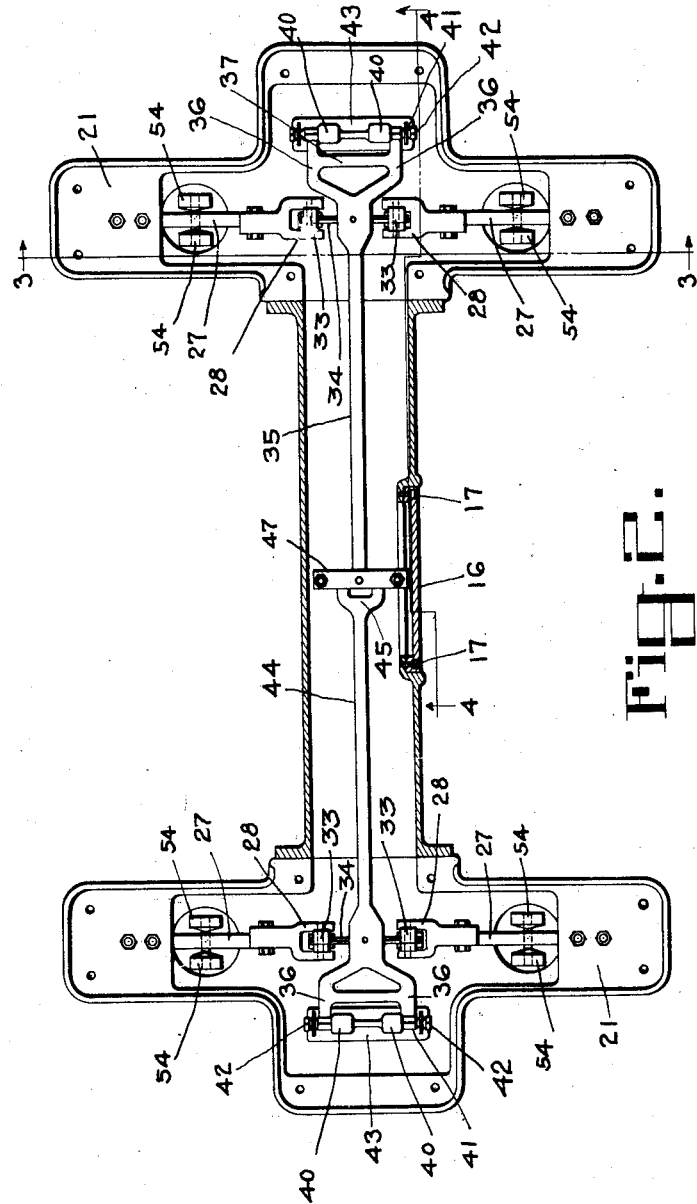
Figure 2 is a top plan view of the lever system arranged within and connected to the housing.
Figure 3:
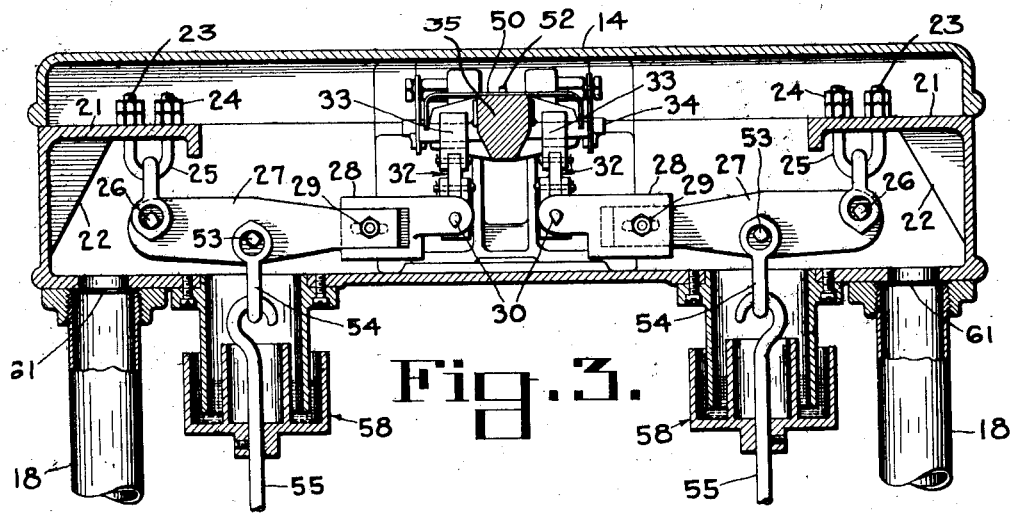
Figure 3 is a vertical cross-sectional view taken on line 3—3 in Figure 2.
Figure 4:
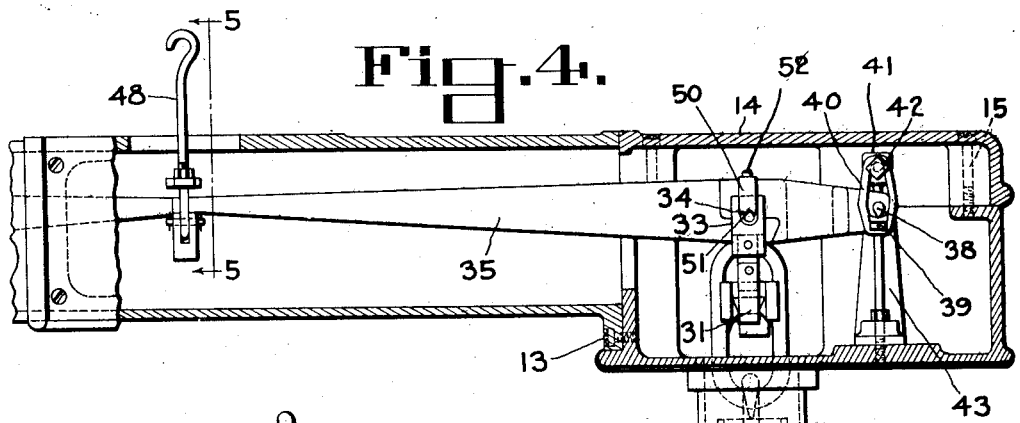
Figure 4 is a vertical cross-sectional view taken on line 4—4 of Figure 2.
Figure 5:
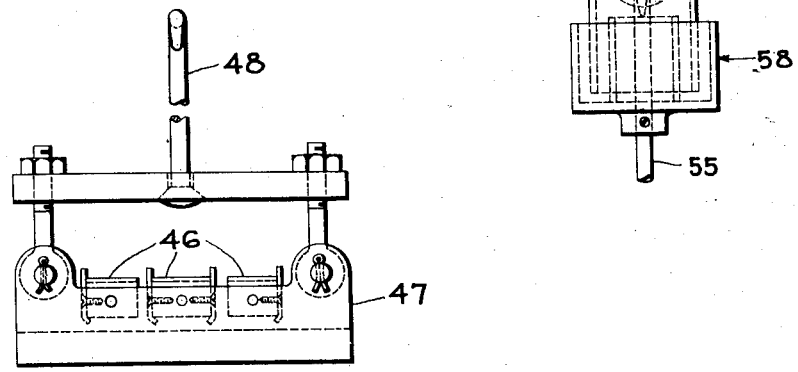
Figure 5 is a detail view taken on line 5—5 in Figure 4.

In the illustrative embodiment of the invention there is shown a housing for the scale levers generally indicated by the reference character 10 and comprising two transverse members or portions 11 connected by a hollow longitudinal member or portion 12 substantially square in cross-section, said members being secured to each other preferably by screws 13. The transverse members are closed by cover-plates 14 secured thereto by screw-bolts 15. Substantially centrally of the longitudinal member 12 there is an opening for the purpose of according easy access to the interior thereof, said opening being closed by means of a cover-plate 16 which is secured to said member by means of screws 17. The abutting edges of said members and cover-plates are machined to provide a substantially air-tight fit.

The housing 10 is supported by hollow posts 18 having feet 19 which are adapted to be secured to the floor where it is desirable to secure the weighing machine in a particular location. The lower extremity of each post is apertured as at 20, the purpose of which will be hereinafter set forth.

The transverse members 11 have inturned flanges 21, which are reinforced by ribs 22 integral with the housing, the flanges being adapted to support the anchor bolts 23 secured thereto by lock nuts 24. Depending from said anchor bolts are the loops 25, which form the fulcrum bearings for knife edge pivots 26 fixed in the butt end of main levers 27. While reversely arranged in the housing, these main levers are identical in form. On the tip end of the main levers are mounted for slidable adjustment the bifurcated nose-irons 28, which are adapted to be secured in adjusted position by any suitable means, as by bolts 29. The nose-irons carry the pivots 30, 30 which rest in bearings 31, 31 carried by the linkages 32, 32, providing a compensating bearing structure, as is well understood in the art.

The upper links 33, 33 of linkages 32 are pivotally supported on a knife edge bearing 34 fixed in the extension lever 35, the outer or butt end of said extension lever being bifurcated to form two divergent arms 36, 36 connected by a cross-piece 37. This construction of the butt end of the extension lever provides a wide bearing, thus eliminating any possibility of the tipping of this lever regardless of where the load to be weighed is placed on the platform. In the ends of the arms 36 are set the knife edge pivots 38 supported on compensating bearings 39 set in loops 40 suitably fulcrumed on reduced portions 41 formed in pins 42. The pins 42 are force fitted into apertures formed in fulcrum stands 43 suitably secured to the bottom plate of the scale housing.

A second extension lever 44, the butt end of which is constructed similar to extension lever 35, has a bifurcated tip portion 45. The tips of the extension levers are supported in bearing blocks 46 pivotally supported in a shackle 47 swivelly mounted on a hooked rod 48, which is suitably connected to a counterbalancing organization (not shown) mounted in the head casing 49.

A clip 50, having notched ends 51 which are adapted to fit over the knife edge of the pivot 34, retains the links 33, 33 in position upon said pivot. The clip is secured to the extension levers by any suitable means, as by screws 52.

The main levers carry load pivots 53, 53 supporting the loops 54, 54 from which depend the hanger rods 55, 55, upon the lower extremities of which are carried a pair of longitudinally arranged angle-irons 56, spaced in parallel relation to each other. A weigh-can 57 is supported on said angle-irons, said weigh-can being adapted to receive the milk to be weighed. After the milk is weighed the weigh-can is emptied by gravity through an opening (not shown) in the bottom of said weigh-can.

To prevent foreign matter from getting into the scales, liquid seals, generally indicated by the reference character 58, are suitably arranged on the hanger rods and the scale housing. For the purpose of keeping the scale mechanism clean and dry an electric lamp 59 is suitably mounted in the neck of the head casing. The heat generated by this lamp aids in the circulation of the air through the scale, the air entering and leaving the scale housing through the medium of the apertures 20 in the posts 18. The posts form conduits for the air which enters therein through the apertures 20 and openings 60 in the aprons 60′, said aprons being adapted to prevent dirt from accumulating upon the feet of the scale. In the upper extremities of each post 18 is a bronze screen 61 which allows the circulation of the air, but prevents the entrance of insects into the scale housing.

A tare beam 61a co-operating with a lever 62a is enclosed within the head casing and the poise 63a thereon is operated by means of a knob 62 operatively connected thereto extending through the front of the casing. The hooked rod 48 connects the extension lever mechanism to the tare lever 62a, while a hooked rod 64a connects the lever 62a to the weight indicating mechanism in the head casing 49 above. The setting can be read on a small revolving chart 63, which may be observed through a window 64 directly above said knob.

Having thus described my invention, what I claim as new and desire to secure by Letters Patent of the United States is:

1. In a weighing mechanism, in combination, a housing comprising a center portion and transverse portions leading therefrom, posts adapted to support said housing, lever mechanism in said housing, and a commodity-receiver suspended from said lever mechanism.

2. In a weighing mechanism, in combination, a housing comprising a longitudinal, center portion and transverse portions at the ends thereof, posts adapted to support said housing, lever mechanism suspended in said housing, and a commodity-receiver suspended from said lever mechanism.

3. In a weighing mechanism, in combination, a housing comprising a longitudinal, center portion and transverse portions at the ends thereof, tubular posts adapted to support the said transverse portions and leading thereto, lever mechanism suspended in said housing, hanger rods depending from said lever mechanism, and a commodity-receiver supported by said hanger rods.

4. In a weighing mechanism, in combination, a housing comprising a longitudinal, center portion and transverse portions at the ends thereof, tubular posts supporting the transverse portions and disposed at the ends of the said transverse portions and communicating therewith, lever mechanism suspended in said housing, hanger rods depending from said lever mechanism, angle-irons secured to said hanger rods, and a commodity-receiver supported on said angle-irons.

5. In a weighing mechanism, in combination, a housing, posts adapted to support said housing, lever mechanism suspended in said housing, hanger rods pivotally supported on said lever mechanism, means for preventing foreign matter from entering the housing comprising liquid seals depending from the housing and disposed around the said hanger rods, and a commodity-receiver supported by said hanger rods.

6. In a weighing mechanism, in combination, a housing 9, comprising a longitudinal, center portion and transverse portions at the ends thereof, tubular posts adapted to support said housing, lever mechanism suspended in said housing, a tare beam and co-operating mechanism connected to the said lever mechanism, hanger rods pivotally supported on said lever mechanism, angle-irons secured to the lower extremities of said rods, and a commodity-receiver mounted on said angle-irons.

7. In a weighing mechanism, in combination, a housing, posts adapted to support said housing, lever mechanism suspended in said housing, hanger rods pivotally supported on said lever mechanism, liquid seals around said rods, and a commodity-receiver suspended on said rods.

8. In a weighing mechanism, in combination, a scale housing, a head casing having a neck portion connected to the said housing, and heating means in said housing adapted to circulate the air therethrough.

9. In a weighing mechanism, in combination, a scale housing, a head casing enclosing counter-balancing mechanism and provided with a neck portion leading from the said housing, and means in the said neck portion for circulating the air therethrough comprising an electric light.

10. In a weighing mechanism, in combination, a housing, hollow posts supporting said housing, said posts having apertures in the walls thereof adapted to permit the passage of air therethrough, and means for circulating the air through said housing.

11. In a weighing mechanism, a housing, hollow posts supporting said housing, said posts having apertures in the walls thereof adapted to permit the passage of air therethrough, and means comprising an electric light for circulating the air through said housing.

12. In a scale mechanism, in combination, a housing, hollow posts supporting said housing, said posts having apertures therein adapted to permit the passage of air therethrough, means for circulating the air through said housing, and means for preventing the entrance of insects into said housing.

13. In a scale mechanism, in combination, a housing, hollow posts supporting said housing, said posts having apertures therein adapted to permit the passage of air therethrough, means for circulating the air through said housing, and means for preventing the entrance of insects into said housing, said means comprising a screen.

14. In a weighing mechanism, in combination, a housing, a lever mechanism, hanger rods pivotally supported on said lever mechanism, liquid sealing means disposed around the upper end of each of the said hanger rods comprising a cup having an annular chamber therein and a circular flange depending from the said housing and operating within the said annular chamber, and a weigh-can mounted on said hanger rods.

15. In a weighing mechanism, in combination, a housing a lever mechanism therein, hanger rods pivotally supported on said lever mechanism, a liquid seal enclosing the upper end of each hanger rod and co-operating with the said housing, angle-irons mounted on said hanger rods, and a weigh-can supported on said angle-irons.

16. In a weighing mechanism, in combination, a scale housing comprising a plurality of transverse members and a longitudinal member, extension levers fulcrumed in said transverse members and extending into said longitudinal member, main levers suspended in said transverse members and supported on said extension levers, and a commodity-receiver suspended from said main levers.

17. In a weighing mechanism, in combination, a scale housing comprising a plurality of transverse members and a longitudinal member, extension levers fulcrumed in said transverse members and extending into said longitudinal member, a plurality of main levers supported on said extension levers and suspended in said transverse members, hanger rods pivotally supported on said main levers, and a commodity-receiver mounted on said hanger rods.

18. In a weighing mechanism, in combination, a scale housing comprising a plurality of transverse members and a longitudinal member, extension levers fulcrumed in said transverse members and extending into said longitudinal member, a plurality of main levers supported on said extension levers and suspended in said transverse members, a shackle for supporting said extension levers, said shackle being adapted to be connected to a load counter-balancing means, hanger rods pivotally supported on said main levers, and a commodity-receiver mounted on said hanger rods.

19. In a weighing mechanism, in combination, a scale housing comprising a plurality of transverse members and a longitudinal member, extension levers fulcrumed in said transverse members and extending into said longitudinal member, main levers suspended in said transverse members and supported on said extension levers, tare mechanism operatively connected to the said extension levers, and a commodity-receiver suspended from said main levers.

20. In a scale mechanism, in combination, a housing, hollow posts supporting said housing, said posts having apertures therein adapted to permit the passage of air therethrough, means for circulating the air through said housing, and a screen mounted in the upper end of each post for preventing the entrance of insects into the said housing.

21. In a weighing mechanism, in combination, longitudinal extension levers provided at their outer ends with means for preventing tipping of the levers comprising bifurcated arms carrying knife edge pivots supported on compensating bearings in loops fulcrumed on fixed pins, one of the extension levers being provided with a bifurcated tip portion and the other with a straight tip disposed between the arms of the bifurcated tip portion.

22. In a weighing mechanism, in combination, longitudinal extension levers provided at their outer ends with means for preventing tipping of the levers comprising bifurcated arms carrying knife-edge pivots supported on compensating bearings in loops fulcrumed on fixed pins, and a shackle provided with bearing blocks adapted to support the tips of the said extension levers and connected to the scale mechanism.

23. In a weighing mechanism, in combination, longitudinal extension levers provided at their outer ends with means for preventing tipping of the levers comprising bifurcated arms carrying knife-edge pivots supported on compensating bearings in loops fulcrumed on fixed pins, and transverse, opposed main levers at the outer ends of the extension levers provided with knife-edge pivots at their butt ends, the said pivots being fulcrumed in loops carried by fixed anchor bolts, from which the main levers are suspended.

24. In a weighing mechanism, in combination, longitudinal extension levers provided at their outer ends with means for preventing tipping of the levers comprising bifurcated arms carrying knife-edge pivots supported on compensating bearings in loops fulcrumed on fixed pins, and transverse, opposed main levers at the outer ends of the extension levers provided with knife-edge pivots at their butt ends, the said pivots being fulcrumed in loops carried by fixed anchor bolts, from which the main levers are suspended, and a bifurcated nose iron adjustably mounted on the inner tip end of each of the main levers and carrying a pivot resting in a bearing carried by a link, co-operating with an upper link pivotally supported on a knife-edge bearing fixed in the outer end of the co-operating extension lever.

25. In a weighing mechanism, in combination, longitudinal extension levers provided at their outer ends with means for preventing tipping of the levers comprising bifurcated arms carrying knife-edge pivots supported on compensating bearings in loops fulcrumed on fixed pins, and transverse, opposed main levers at the outer ends of the extension levers provided with knife-edge pivots at their butt ends, the said pivots being fulcrumed in loops carried by fixed anchor bolts, from which the main levers are suspended, a bifurcated nose iron adjustably mounted on the inner tip end of each of the main levers and carrying a pivot resting in a bearing carried by a link, co-operating with an upper link pivotally supported on a knife-edge bearing fixed in the outer end of the co-operating extension lever, and means for retaining the said upper link in position.

26. In a weighing mechanism, in combination, longitudinal extension levers provided at their outer ends with means for preventing tipping of the levers comprising bifurcated arms carrying knife-edge pivots supported on compensating bearings in loops fulcrumed on fixed pins, and transverse, opposed main levers at the outer ends of the extension levers provided with knife-edge pivots at their butt ends, the said pivots being fulcrumed in loops carried by fixed anchor bolts, from which the main levers are suspended, a bifurcated nose iron adjustably mounted on the inner tip end of each of the main levers and carrying a pivot resting in a bearing carried by a link, co-operating with an upper link pivotally supported on a knife-edge bearing fixed in the outer end of the co-operating extension lever, a load pivot adjacent to the outer end of each main lever and supporting a loop, a hanger rod depending from each loop, and a weigh-can suspended on the said hanger rods.

In testimony whereof I have signed my name to this specification.

ALFRED BOUSFIELD.